Sept. 15, 1925.
E. L. BALSLEY
1,553,588
CLINKER AND POKER EXTRACTOR
Filed May 11, 1925
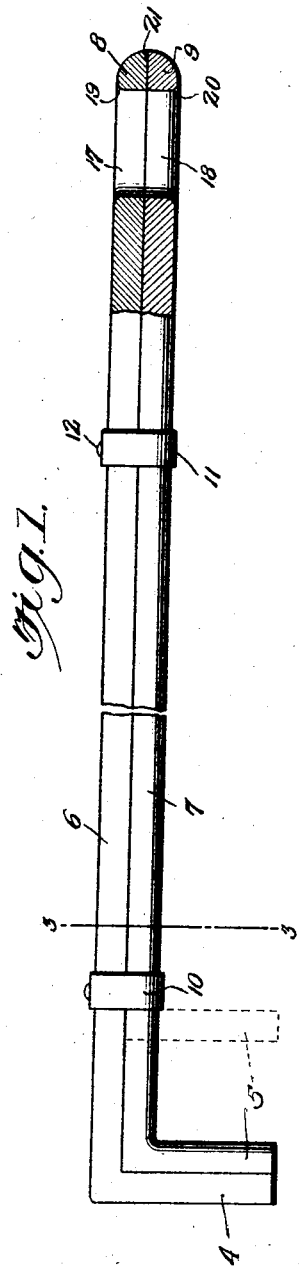
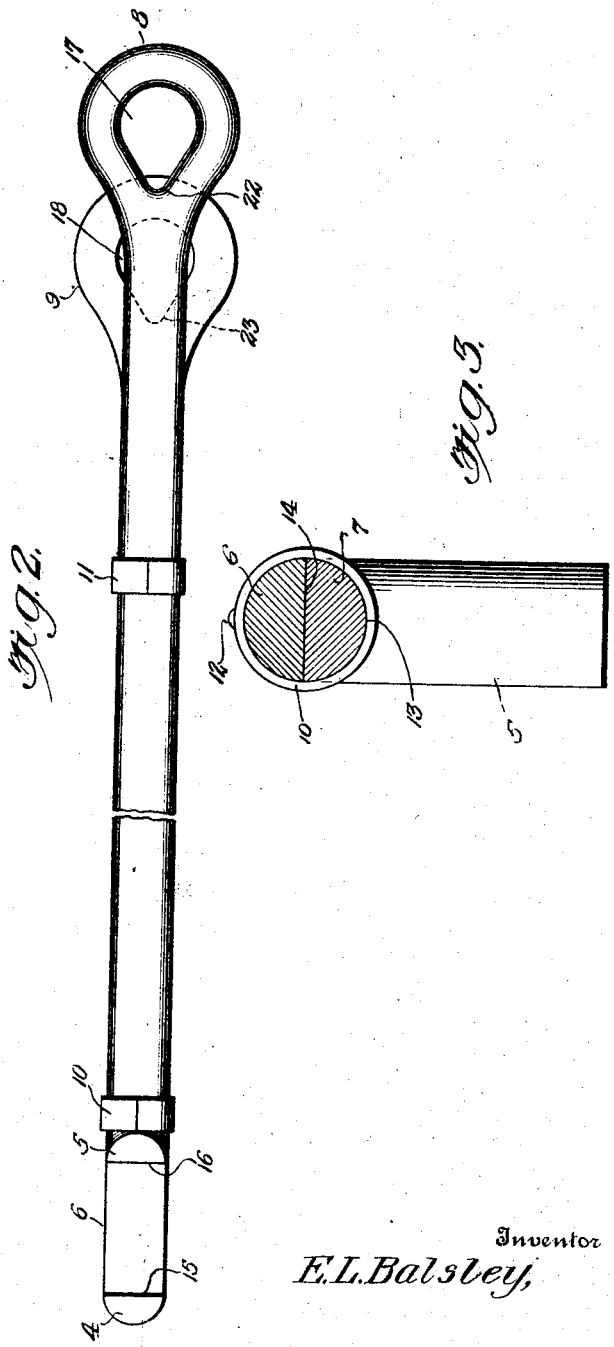
Inventor
E. L. Balsley,
By Mawhinney & Mawhinney
Attorneys

Patented Sept. 15, 1925.

1,553,588

UNITED STATES PATENT OFFICE.

ELMER L. BALSLEY, OF HAMMOND, INDIANA.

CLINKER AND POKER EXTRACTOR.

Application filed May 11, 1925. Serial No. 29,484.

*To all whom it may concern:*

Be it known that ELMER L. BALSLEY, a citizen of the United States, residing at Hammond, in the county of Lake and State of Indiana, has invented certain new and useful Improvements in Clinker and Poker Extractors, of which the following is a specification.

The present invention relates to improvements in clinker and poker extractors, and has for an object to provide an improved poker which will be useful as an extractor for lifting and removing clinkers and to this end the device is constructed of relatively moving parts with complemental jaws adapted to grip the clinker therein and with handle members for manipulating the jaws when in the furnace.

I am aware it is not original with me to provide an implement having the above general characteristics, but implements so far proposed for this purpose have not been successful in practice; and it is therefore a further object of the invention to provide an implement which in the collapsed position will form a strong and effective poker and which admits of being readily opened and quickly manipulated by a novel form of handle arrangement to deal with the clinkers when need be.

A further object of the invention resides in providing a simple, compact and strong device wherein the jaws will close together firmly throughout to form an adequate poker.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a side view with the handle portion broken away showing an implement constructed according to the present invention.

Figure 2 is a bottom plan view with the parts in the fully open position, and

Figure 3 is a cross section taken on the line 3—3 in Figure 1.

Referring more particularly to the drawings the device is composed generally of two members being relatively movable and extending all in substantially the same plane with the exception of the two cooperating jaw members 4 and 5. These jaw members are carried respectively upon the elongated shanks 6 and 7 and at the opposite ends of the shanks are the handles 8 and 9. The members are preserved in assembled relation by means of two or more collars 10 and 11. The intermediate portions of the collars are secured to the upper part of the shank member 6 as by the fastenings 12, while the free ends of the collars, as shown in Figure 3, meet at the point 13. The collars will be of yieldable material, although very stiff in order to retain their form and to hold the lower shank member 7 therein while admitting of its sliding freely with respect to the upper member 6. By opening the ends of the collars at 13 the shank member 7 may be removed from the companion member 6. This is desirable in case of a broken jaw or the need for straightening the parts.

The shank members 6 and 7 are rounded on their outer sides and they are both complemental solid semi-cylinders with their flat portions indicated at 14 in Figure 3 extending in contact throughout and forming a wide and elongated surface on which the two shanks are free to slide, while being confined by the collars 10 and 11, in a proper axial position.

As shown in Figure 2 the jaws 5 and 6 are of similar cross section being half round or semi-cylindrical and solid. This gives the double advantage of providing flat internal gripping surfaces 15 and 16, which are parallel to one another for conveniently gripping and tenaciously holding the clinker; while in Figure 1 the jaws when brought together are shown to form a single solid round poker extension or prong. The surfaces 15 and 16 contact throughout the entire poker extension or prong so that the prong is reinforced. Moreover the outer external surface of the prong is completely cylindrical and smooth, so that it can readily pass in among the clinkers and through the ashes and it will slide off the clinkers and parts of the grate bars, so that it will perform its work in the best possible manner, while securing great strength in the device. The shank members 6 and 7 also fit together in the same fashion and besides possessing strength in themselves they reinforce the poker prong and the clinker jaws.

At the opposite ends of the handles 8 and 9 are formed into the enlarging eyes 17 and 18 having the rounded outer portions 19 and 20 and the inner flat portions 21 extending in alinement with the flat portions of the shanks and the portions of the handle are spread in the same plane with the shank members.

The eyes 17 and 18 are provided with the constricted parts 22 and 23 inwardly of the ends of the handle members.

In the use of the device, the implement will assume the position shown in Figure 1 when used as a poker. The line of contact is preserved throughout all parts including the shanks, handles and jaws and this contact is the broadest possible contact due to the fact that it is made diametrically across the clyindrical members. The implement is therefore for all purposes solid and affords the same rigidity and strength as a solid poker implement.

The eyes 17 and 18 in the handles register in this position and admit the hand of the operator so that there will be no tendency for the jaws 4 and 5 to open. The friction of the collars 10 and 11 will also assist to prevent this opening movement. The jaws, however, may be moved out as far as the position indicated in Figure 2 where the collar 10 forms a stop for the jaw 5. In this position the poker may be inserted in the clinker door of the furnace by holding the jaws sidewise and then turning the same. The flatwise condition of the handles serves to readily hold, while at the same time turning the device and the left hand may be utilized to support the shanks in or about the collar 11, while the right hand engages with the handles, the thumb against the end of the handle 8, while the index finger rests in the eye 17 of the lower handle member 9. The rounded surface conforms to the finger. The thumb is compressed in the direction of the shank 6, while the index finger is pushed in the opposite direction. The mere pressure between the thumb and this finger will hold the jaws in the open position. As soon as the clinker is engaged the thumb may slip over into the eye of the jaw 8 while the index finger slips out and behind the lower jaw 9. The pressure of the thumb is exerted away from the shank and the second finger may be brought up to reinforce the index finger on the outer end of the lower jaw 9 tending to push this handle toward the jaw 4. The flat portion of the handle guides the thumb in this position and prevents the thumb from entering between the handle members and being pinched. The device enables a secure grip to be had upon the clinker enabling its quick removal from the fire box.

The constricted portions 22 and 23 of the eyes in the handles serve to avoid the thumb or finger getting down into the space between the two handle members when the handle members are in the fully open position or in a position approximating the full open position.

It is obvious that various changes and modifications may be made in the details of construction and design of the above specifically described embodiment of this invention without departing from the spirit thereof, such changes and modifications being restricted only by the scope of the following claims:—

What is claimed is:—

1. A clinker and poker extractor comprising a pair of complemental members of semi-cylindrical solid section having their rounded surfaces apart and their flat surfaces in sliding contact, jaws extending substantially right angularly from the members at one end and also being of semi-cylindrical solid section with their flat ends fitting together throughout in one position, means to hold the members slidably together, and handles extending in the same plane with said members and having eyes adapted to overlap in the closed position of said jaws.

2. A clinker and poker extractor comprising a pair of upper and lower shanks of half round section with their flat surfaces fitting slidably together in an axial direction, collars secured at their intermediate points to one of the members and being bent around to embrace the other member and to hold it frictionally to the first member, jaws on said shank members extending substantially at right angles to the axis of the shank members and being also of semi-cylindrical solid section with their flat parallel faces adapted to come together throughout and form a poker prong having the substantially cylindrical outer surface, and handles on the other ends of the shank members extending in the same plane with the shank members and also being of semi-cylindrical solid section with their flat portions sliding on one another, said handles having openings therein with constricted inner ends and rounded side walls on their outer sides.

In testimony whereof I affix my signature.

ELMER L. BALSLEY.